(No Model.)
J. E. DEAN.
STANCHION.
No. 249,023. Patented Nov. 1, 1881.
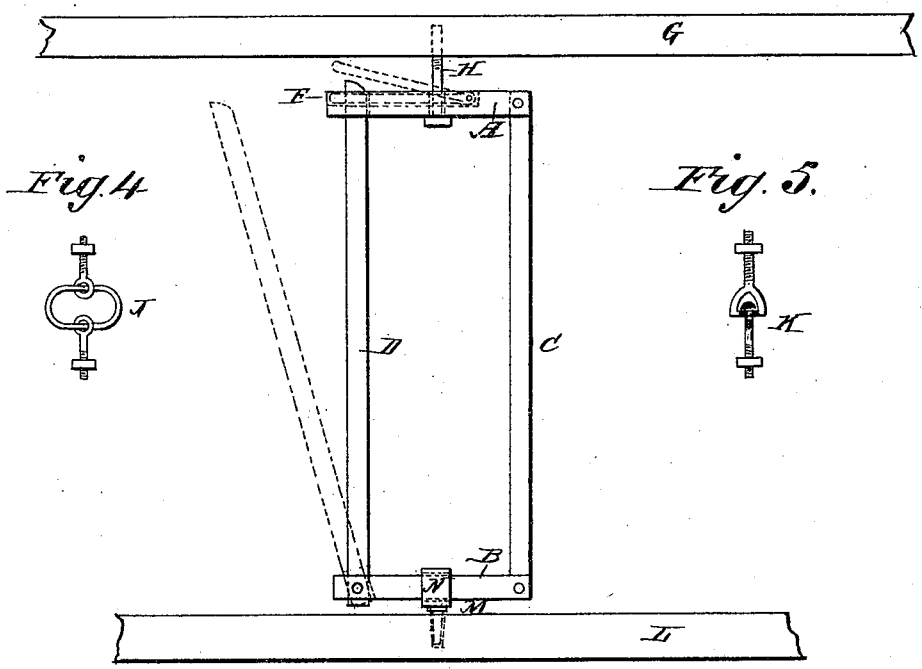
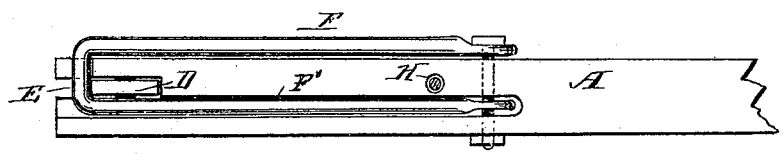
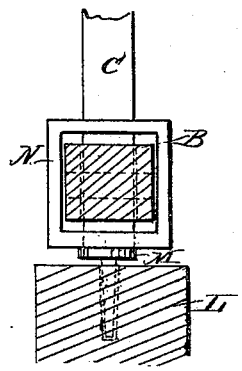
WITNESSES:
INVENTOR:
J. E. Dean
BY
ATTORNEYS.

UNITED STATES PATENT OFFICE.

JAMES E. DEAN, OF WINSTED, CONNECTICUT.

STANCHION.

SPECIFICATION forming part of Letters Patent No. 249,023, dated November 1, 1881.

Application filed May 12, 1881. (No model.)

*To all whom it may concern:*

Be it known that I, JAMES E. DEAN, of Winsted, Litchfield county, Connecticut, have invented a new and Improved Stanchion, of which the following is a specification.

The object of my invention is to provide an improved, durable, and strong device for holding cattle in the stalls.

In the accompanying drawings, Figure 1 is a front elevation of my improved cattle-stanchion. Fig. 2 is a detail plan of one end of the upper transverse bar. Fig. 3 is a detail cross-sectional elevation of the bottom transverse bar. Figs. 4 and 5 are views of the swivels for holding the stanchion to the top bar and sill.

Similar letters of reference indicate corresponding parts.

The stanchion is formed of the upper transverse bar, A, the lower transverse bar, B, and the longitudinal side bars, C D, the latter of which is pivoted to one end of the bottom transverse bar, B, the upper end of this bar being beveled or rounded toward the inside and fitting in a recess or slot, E, in the end of the upper transverse bar, A. The upper end of this side bar, D, projects slightly above the upper transverse bar, A, as shown in Fig. 1. A U-shaped latch-rod, F, is pivoted to the upper transverse bar, A, the end of this U-shaped rod reaching to the outer edge of the side bar, D, when the same is in the slot or recess E of the bar A. One shank of the U-shaped latch F fits into a longitudinal recess, F', in the top of the upper rail, A. The bar A is suspended from a beam, G, by a bolt, H, or by swivels J or K, and the lower transverse bar, B, is held to the sill-plate L by a bolt, a swivel, or by a pivot or pintle, M, attached to an eye, N, through which the bottom rail, B, passes. The eye N is not attached to the bar B, but the latter can move freely in the eye N, and thus permits of a swinging or lateral motion of the stanchion at its lower end only, so that the stanchion can move sidewise a short distance when the animal lowers its head. The lateral motion of the stanchions being almost nothing at its upper end, the stalls may be placed nearer together without danger of the animals injuring each other by fighting than with any other style of stanchion. The U-shaped latch-rod F is raised and the side-bar is swung outward, as shown in Fig. 1, to admit the head of the animal. The bar D is then moved back again, and as its upper end enters the slot E the beveled or rounded edge raises the latch-rod F, which drops when the edge of the bar has passed, and thus locks this bar in place. No springs are required for the latch, which can be opened very conveniently, and, as has been stated, it locks the bar D automatically.

I am aware that prior patents show cattle-stanchions with the neck-bars fixed in cross-pieces which move upon pivots and have lateral motion, so as to move with the neck of the animal right and left. I hereby disclaim the same.

What I claim, and desire to secure by Letters Patent, is—

The combination, with the beam G and sill L, of the cattle-stanchion consisting of the transverse bars A B, the stationary bar C, the pivoted bar D, and latch F, the bolt H, connecting the stanchion to beam G, and the pintle M, provided with the eye N, through which the transverse bar B moves laterally, whereby the whole frame may have rotary and the lower part lateral or swinging motion in combination therewith, substantially as shown and described.

JAMES EDWIN DEAN.

Witnesses:
EDWY E. BENEDICT,
SAMUEL A. HERMAN.